United States Patent
Kira

(10) Patent No.: US 7,059,443 B2
(45) Date of Patent: Jun. 13, 2006

(54) MOTOR-COOLING STRUCTURE OF FRONT-AND-REAR-WHEEL-DRIVE VEHICLE

(75) Inventor: Nobuhiro Kira, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 293 days.

(21) Appl. No.: 10/719,982

(22) Filed: Nov. 24, 2003

(65) Prior Publication Data
US 2004/0154846 A1 Aug. 12, 2004

(30) Foreign Application Priority Data
Nov. 29, 2002 (JP) .............................. 2002-347199

(51) Int. Cl.
*B60K 17/356* (2006.01)
(52) U.S. Cl. .................... 180/243; 180/65.6; 184/6.12
(58) Field of Classification Search ..................... None
See application file for complete search history.

(56) References Cited

U.S. PATENT DOCUMENTS

| | | | | |
|---|---|---|---|---|
| 3,529,698 A | * | 9/1970 | Nelson ....................... 184/6.12 |
| 4,240,524 A | * | 12/1980 | Katayama et al. .......... 184/6.12 |
| 5,495,906 A | * | 3/1996 | Furutani .................... 180/65.2 |
| 6,059,064 A | * | 5/2000 | Nagano et al. .............. 180/243 |
| 6,166,498 A | * | 12/2000 | Yamaguchi et al. ........... 318/34 |
| 6,321,865 B1 | * | 11/2001 | Kuribayashi et al. ....... 180/243 |
| 6,419,040 B1 | * | 7/2002 | Kitano et al. ................ 180/243 |
| 6,513,609 B1 | * | 2/2003 | Hasegawa ................... 180/65.6 |
| 6,540,636 B1 | * | 4/2003 | Amanuma et al. .......... 475/149 |
| 2001/0024997 A1 | * | 9/2001 | Sugano et al. | |
| 2002/0139592 A1 | * | 10/2002 | Fukasaku et al. | |

FOREIGN PATENT DOCUMENTS

| JP | 5-310048 | | 11/1993 |
|---|---|---|---|
| JP | 6-38303 | | 2/1994 |
| JP | 2001-333507 | | 11/2001 |
| JP | 2002-200928 | * | 7/2002 |

* cited by examiner

*Primary Examiner*—Christopher P. Ellis
*Assistant Examiner*—Christopher Bottorff
(74) *Attorney, Agent, or Firm*—Arent Fox PLLC

(57) ABSTRACT

A rear wheel driving unit of a hybrid vehicle includes an oil catch tank that stores oil splashed from an oil sump formed on a bottom of a casing body by a driven gear of a differential. A slinger chamber to which the oil is supplied from the oil catch tank has a slinger disposed therein that is driven by the motor through gears. To cool the motor, the oil is supplied from the oil catch tank to an oil passage in a main shaft leading to the inside of a motor shaft by gravitational force. The oil splashed from the slinger chamber by the slinger is supplied to the oil passage to effectively cool the motor using the lubricating oil from the differential.

7 Claims, 6 Drawing Sheets

MOTOR-COOLING STRUCTURE OF FRONT-AND-REAR-WHEEL-DRIVE VEHICLE

BACKGROUND OF THE INVENTION

1. Field of the Invention

The present invention relates to a motor-cooling structure of a front-and-rear-wheel-drive vehicle having an engine adapted to drive first driven wheels and a motor adapted to drive second driven wheels, wherein a driving force of the motor is transmitted to the second driven wheels through a reduction unit and a differential.

2. Description of the Related Art

A hybrid vehicle is disclosed in Japanese Patent Application Laid-open Nos. 5-310048 and 6-38303, wherein driven wheels are driven by an engine and/or a motor. A lubricating oil is drawn by a special electric pump and is used to cool the motor.

A hybrid vehicle is disclosed in Japanese Patent Application Laid-open No. 2001-333507, wherein front wheels are driven by an engine, rear wheels are driven by a motor, and a generator driven by the engine is cooled by engine cooling water.

However, in the hybrid vehicle disclosed in Japanese Patent Application Laid-open Nos. 5-310048 and 6-38303, the motor is cooled by drawing lubricating oil using the special electric pump, which results in a drawback as the number of parts is increased due to the required electric pump. While it is conceivable that the electric pump could be eliminated and the motor cooled using oil from an oil sump by a gear, such an approach would have difficulty effectively cooling the motor.

Furthermore, it is also conceivable that the motor can be cooled using engine cooling water as disclosed in the hybrid vehicle described in Japanese Patent Application Laid-open No. 2001-333507. However, such an approach renders bringing the cooling water into direct contact with a rotor and a stator of the motor very difficult, if not impossible. Additionally, the cooling water can be only caused to flow through a housing of the motor. As such, it is also difficult to achieve a sufficient cooling effect.

SUMMARY OF THE INVENTION

Accordingly, it is an aspect of the present invention to provide, in a hybrid vehicle wherein a driving force of a motor is transmitted to driven wheels through a differential, a motor that is effectively cooled using the lubricating oil for the differential.

To achieve the above aspect, according to a first feature of the present invention, a motor-cooling structure is provided in a front-and-rear-wheel-drive vehicle having an engine adapted to drive first driven wheels and a motor adapted to drive second driven wheels, wherein a driving force of the motor is transmitted to the second driven wheels through a reduction unit and a differential. The motor-cooling structure includes a casing accommodating the reduction unit and the differential. An oil sump is formed on a bottom of the casing. A first oil storage chamber is provided within the casing and stores an oil splashed from the oil sump by a driven gear of the differential. A second oil storage chamber is provided within the casing and stores the oil splashed from the oil sump by the driven gear of the differential. A first oil supply passage is provided in an inner surface of the casing to supply the oil within the first storage chamber into a motor shaft using gravitational force to thereby cool the motor accommodated in a motor housing coupled to the casing. An oil supply means is disposed in the second oil storage chamber and is driven by the motor. A second oil supply passage is provided in the inner surface of the casing to supply the oil splashed by the oil supply means into the motor shaft, thereby cooling the motor.

With the above arrangement, the oil splashed from the oil sump by the driven gear of the differential is stored in the first and second storage chambers and then supplied therefrom into the motor shaft to cool the motor, rather than sprinkling the oil splashed from the oil sump by the driven gear of the differential directly onto the motor to cool the motor. Therefore, a motor-cooling effect is significantly enhanced without requiring a special radiator and a special cooling-water pump. Moreover, an oil surface in the oil sump is lowered in correspondence to an amount of the oil stored in the first and second oil storage chambers, so that oil-agitation resistance provided by the driven gear is significantly decreased.

In addition, the oil in the second oil storage chamber is supplied to the motor by the oil supply means driven by the motor. Therefore, even when the vehicle is traveling at a low speed wherein the amount of the oil splashed by the driven gear is less, a sufficient amount of oil is supplied from the second oil storage chamber to provide the desired motor-cooling performance. Moreover, the oil supply means is driven by the motor and hence, a special drive source and a special oil pump are not required. Additionally, the number of parts, overall system weight, friction resistance, cost, and the like is not increased.

According to a second feature of the present invention, in addition to the arrangement of the first feature, the motor-cooling structure further includes a third oil supply passage which supplies the oil in the first oil storage chamber to the second oil storage chamber using gravitational force.

With the above arrangement, the oil in the first oil storage chamber is supplied to the second oil storage chamber via the third oil supply passage using gravitational force, wherein a portion of the oil which has not been supplied from the first oil storage chamber to the motor is recovered in the second oil storage chamber to be reliably supplied to the motor.

According to a third feature of the present invention, in addition to the arrangement of the second feature, a tub-shaped oil-receiving portion is provided below the third oil supply passage and facing an outer periphery of the oil supply means. The tub-shaped oil-receiving portion guides the oil from the third oil supply passage and the oil from the oil supply to the second oil supply passage.

With the above arrangement, the tub-shaped oil-receiving portion is provided below the third oil supply passage and facing the outer periphery of the oil supply means. Therefore, the oil from the third oil supply passage and the oil from the oil supply means are received in the oil-receiving portion to be reliably guided to the second oil supply passage.

According to a fourth feature of the present invention, in addition to the arrangement of the first feature, the second oil storage chamber and the oil sump are partitioned from each other by a partition wall.

With the above arrangement, because the second oil storage chamber and the oil sump are partitioned from each other by the partition wall, the oil in the second oil storage chamber is prevented from flowing therefrom into the oil sump by the inclination of a road surface or by a longitudinal acceleration of the vehicle. Accordingly, supply of oil to the motor by the oil supply means is reliably carried out.

According to a fifth feature of the present invention, in addition to the arrangement of the first feature, a clutch is disposed between the driven gear and the differential.

With the above arrangement, because the clutch is disposed between the driven gear and the differential, the oil supply means and the driven gear are stopped by cutting-off the clutch when the motor is stopped, thereby decreasing the oil-agitation resistance.

According to a sixth feature of the present invention, in addition to the arrangement of the fifth feature, when the clutch is coupled, the oil supply means is driven by the motor or the second driven wheels.

With the above arrangement, when the vehicle travels with the clutch coupled, the oil is driven by a driving force from the motor, thereby cooling the motor. Also, when the vehicle is regeneratively braked with the clutch coupled, the oil is driven by a driving force from the second driven wheels, thereby cooling the motor.

According to a seventh feature of the present invention, in addition to the arrangement of the fifth feature, when the clutch is cut off, the oil supply means is driven by the motor.

With the above arrangement, even when the vehicle is stopped, the motor is cooled by driving the oil supply means with the clutch cut off.

An oil passage 12c in an embodiment corresponds to the first oil supply passage of the present invention; an oil passage 12f corresponds to the second oil supply passage; a through-bore 12e corresponds to the third oil supply passage; a final driven gear corresponds to the driven gear; a slinger chamber 61 corresponds to the second oil storage chamber; a slinger 65 corresponds to the oil supply means; and an oil catch tank 71 corresponds to the first oil storage chamber.

The above and other aspects, features and advantages of the invention will become apparent from the following description of the preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
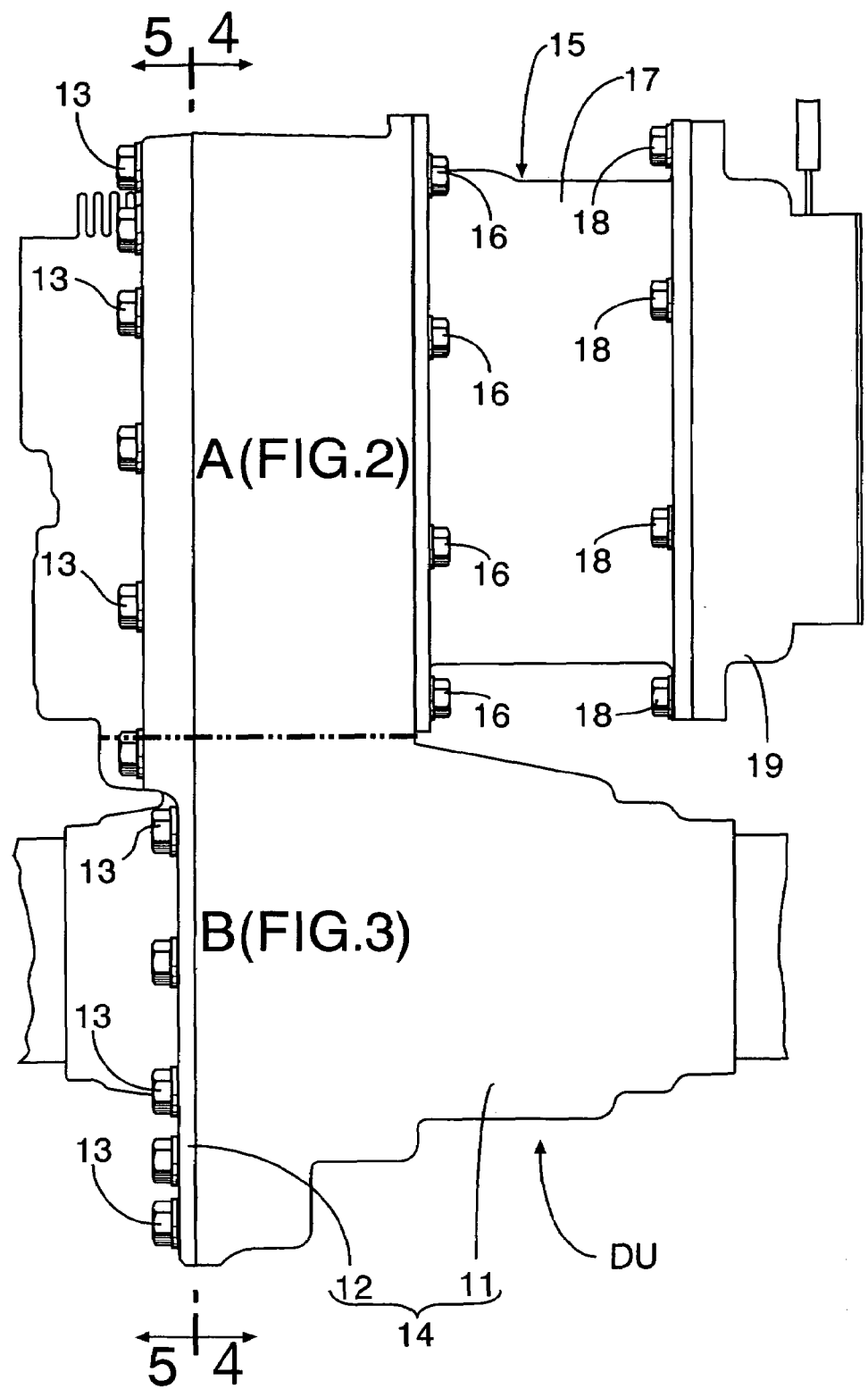
FIG. 1 is a plan view of the contour of a rear wheel driving unit.

FIG. 1 shows the contour of a driving unit DU for rear wheels mounted on a front-and-rear-wheel-drive vehicle, wherein front wheels, i.e., first driven wheels, are driven by an engine, and rear wheels, i.e., second driven wheels, are driven by a motor.

Figure 2:
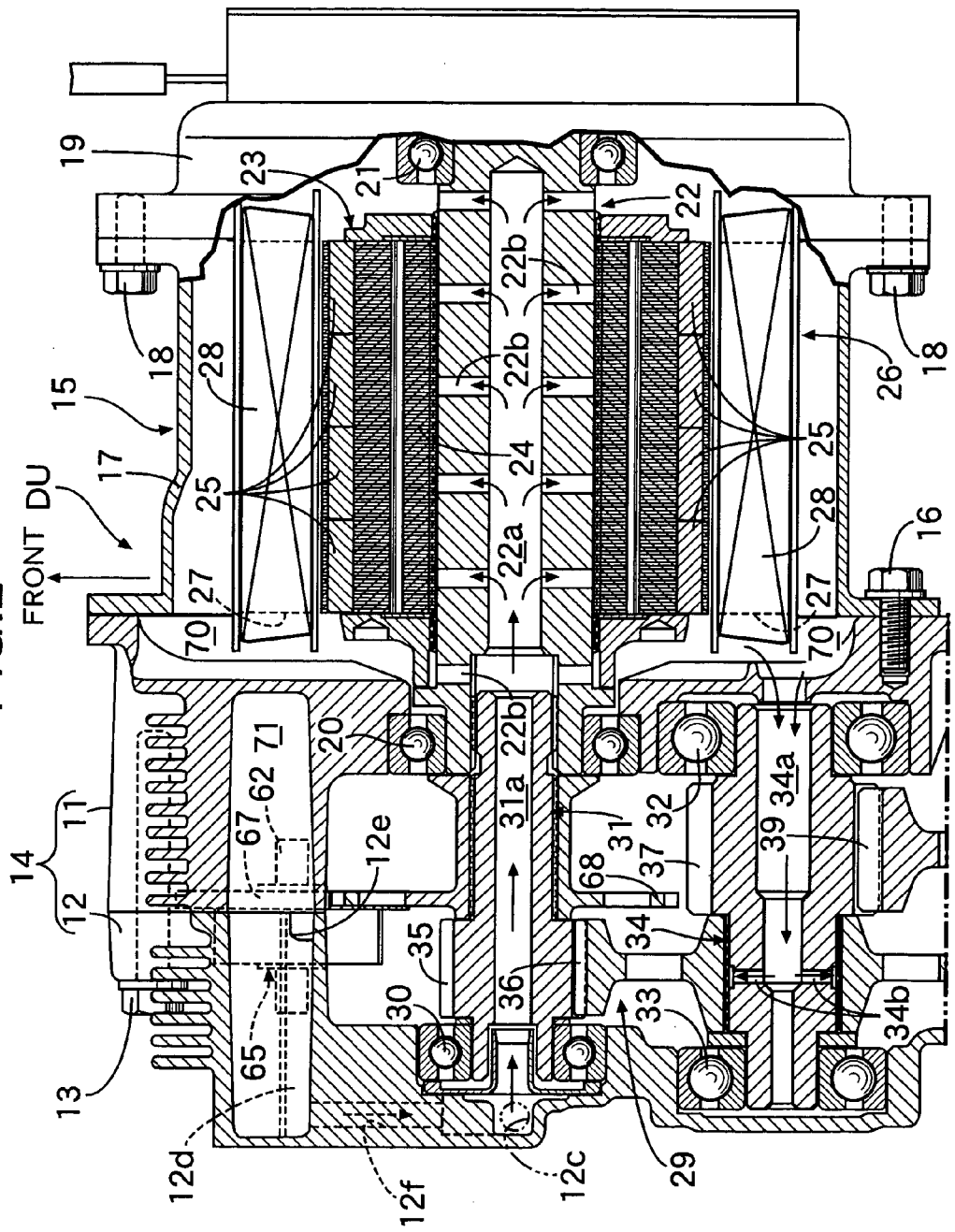
FIG. 2 is an enlarged sectional view of area A in FIG. 1.
Figure 3:
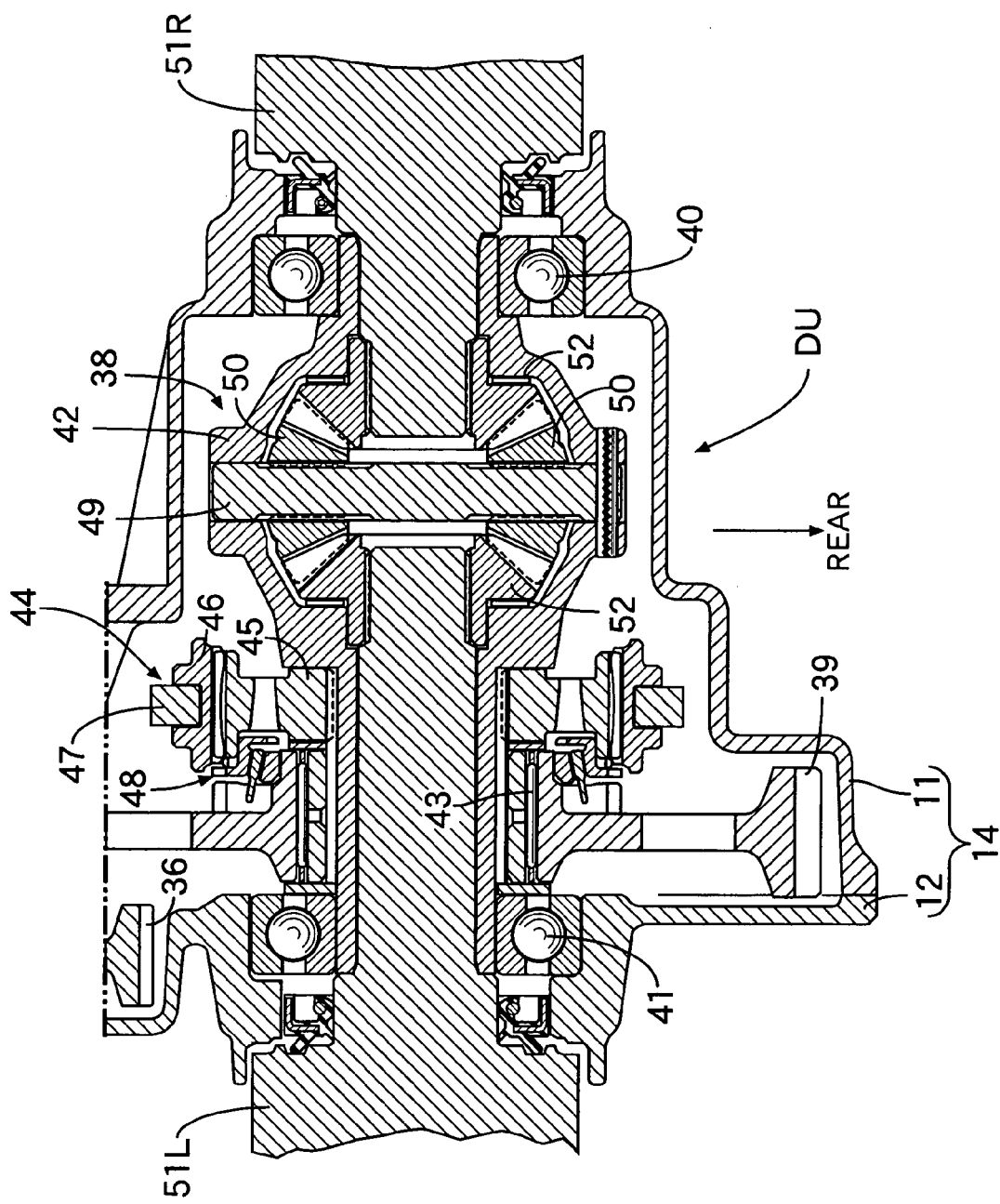
FIG. 3 is an enlarged sectional view of area B in FIG. 1.
Figure 4:
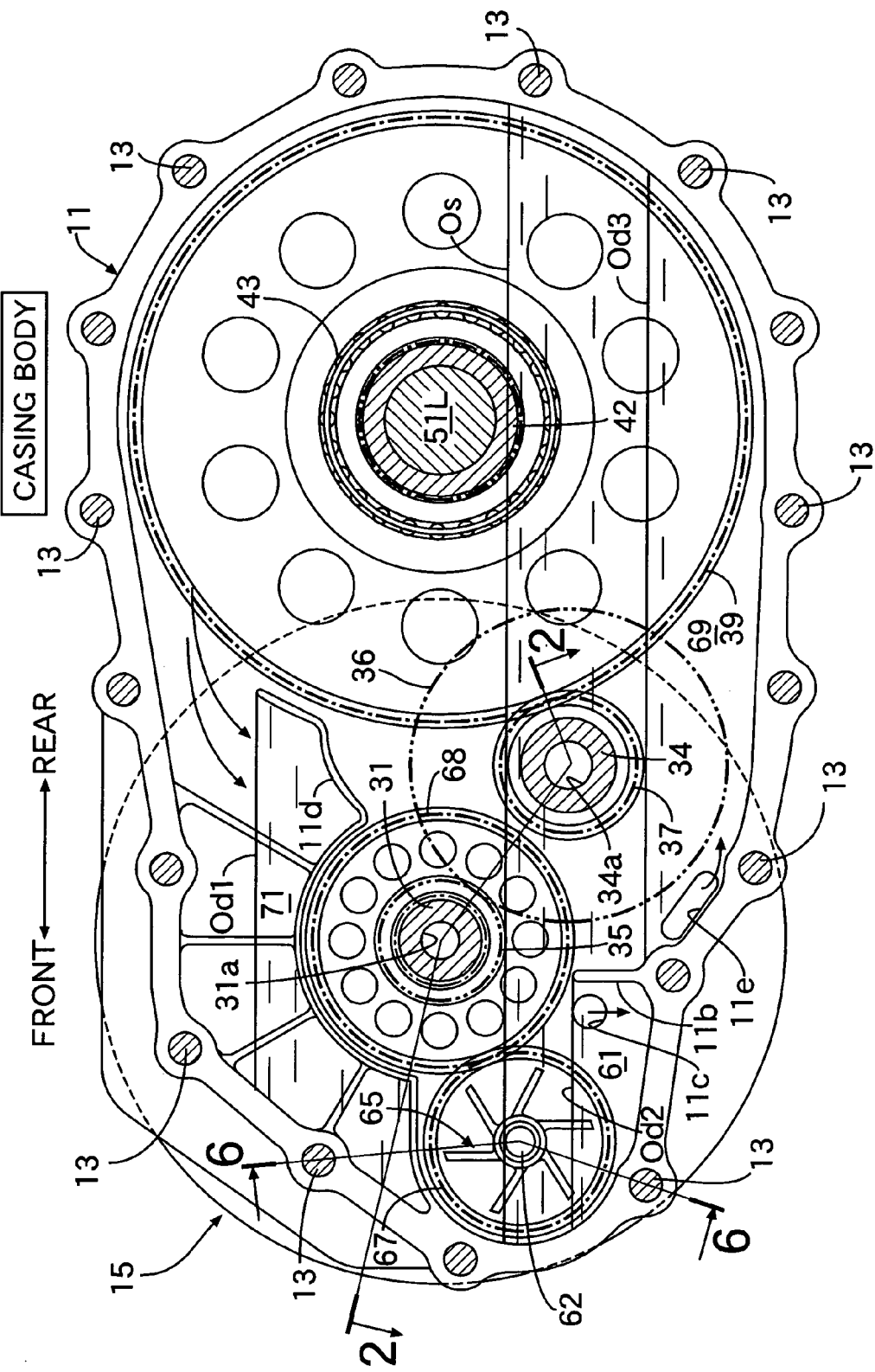
FIG. 4 is a cross-sectional view taken along line 4—4 in FIG. 1.
Figure 5:
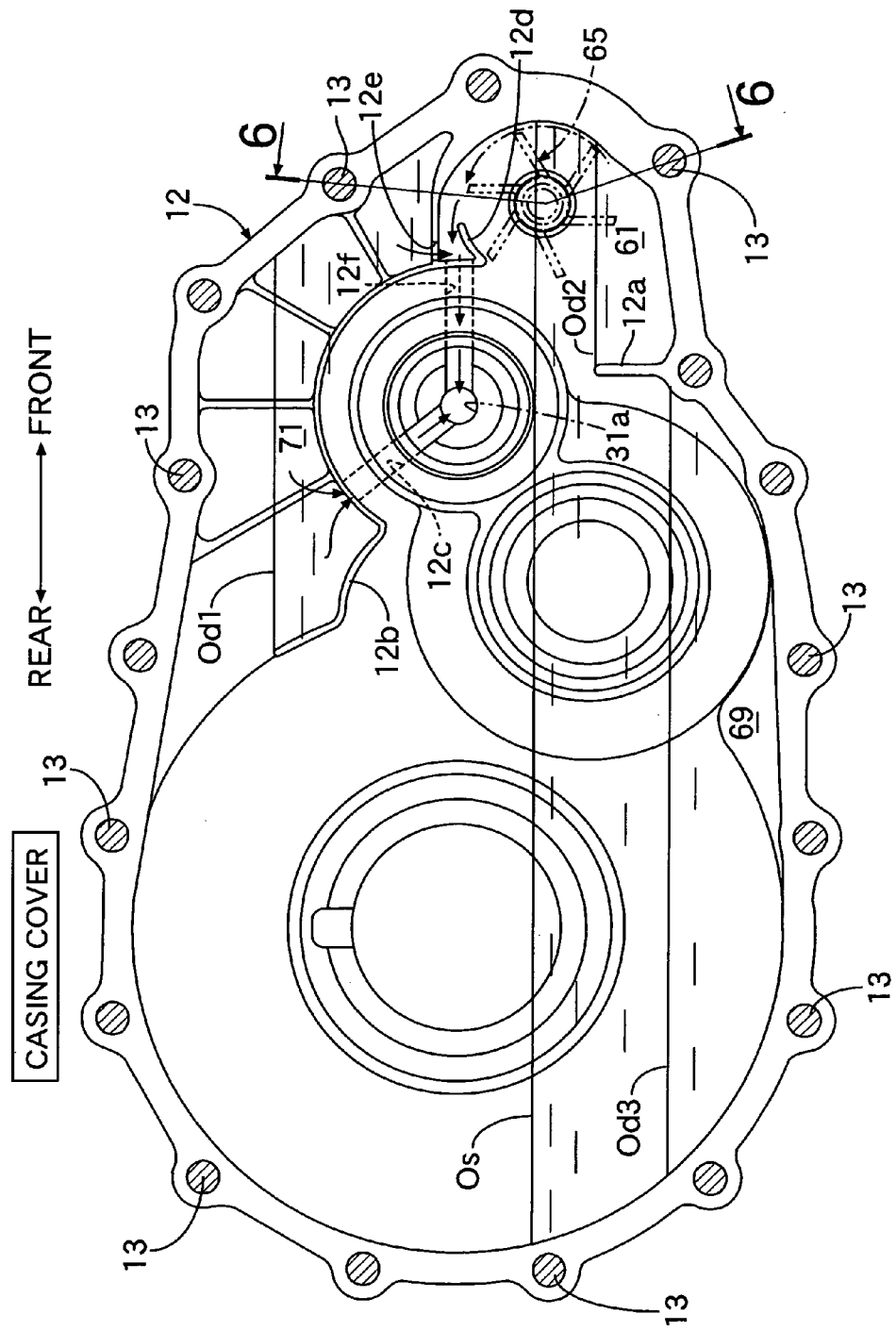
FIG. 5 is a cross-sectional view taken along line 5—5 in FIG. 1.
Figure 6:
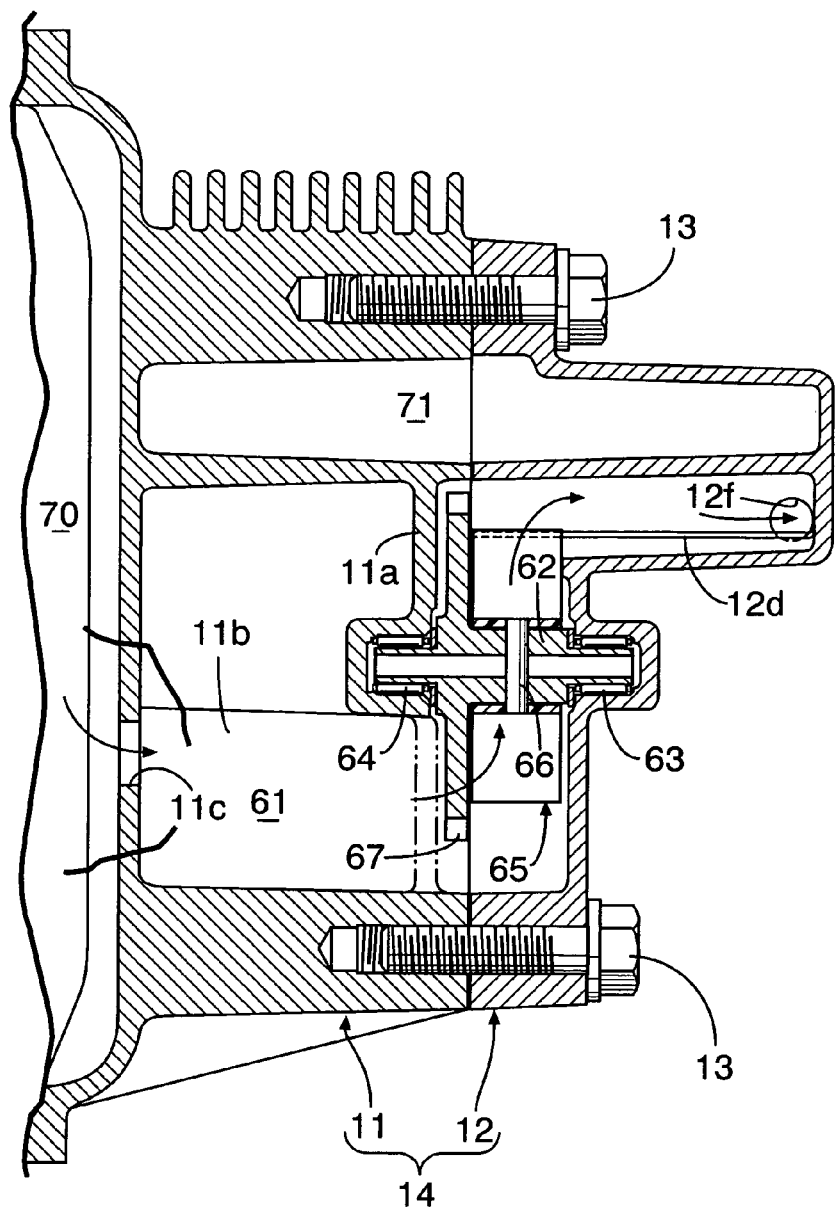
FIG. 6 is an enlarged sectional view taken along line 6—6 in FIGS. 4 and 5.

As also shown in FIGS. 2 and 3, the driving unit DU includes a casing 14 having a casing body 11 and a casing cover 12 fastened to each other using a plurality of bolts 13. A motor 15 is mounted to a right side of a front portion of the casing body 11 by a plurality of bolts 16. The motor 15 includes a cylindrical motor housing 17 fastened to the casing body 11 by the bolts 16. A motor cover 19 is fastened to the motor housing 17 by a plurality of bolts 18 to cover a right side of the motor housing 17. A motor shaft 22 is rotatably supported by the casing body 11 and motor cover 19 using ball bearings 20 and 21 interposed therebetween, respectively.

A rotor 23 fixed to an outer periphery of the motor shaft 22 includes a yoke 24 having a plurality of iron plates laminated onto one another, and a plurality of field magnets 25 fixed to an outer peripheral portion of the yoke 24. A stator 26 is fixed to an inner periphery of the motor housing 17, and includes a plurality of coils 28 wound around a plurality of iron cores 27.

A reduction unit 29 accommodated in the casing 14 extends from a front portion to a central portion of the casing 14. The reduction unit 29 includes a main shaft 31 spline-coupled at a right end to an inner periphery of an end of the motor shaft 22 and supported at a left end on the casing cover 12 by a ball bearing 30. A counter shaft 34 of the reduction unit 29 is disposed in the rear of and below the main shaft 31 in parallel to the main shaft 31 and supported on the casing body 11 and casing cover 12 by ball bearings 32 and 33.

A first small diameter reducing gear 35 integrally formed on the main shaft 31 is meshed with a second large diameter reducing gear 36 spline-coupled to the counter shaft 34. A final small diameter driving gear 37 integrally formed on the counter shaft 34 is meshed with a final large diameter driven gear 39 of a differential 38. Therefore, the rotation of the motor shaft 22 is transmitted to the differential 38 via a path including the main shaft 31→the first reducing gear 35→the second reducing gear 36→the counter shaft 34→the final driving gear 37→and the final driven gear 39.

The differential 38 includes a differential case 42 rotatably supported on the casing body 11 and the casing cover 12 using ball bearings 40 and 41 interposed, respectively, therebetween. The final driven gear 39 is rotatably supported on an outer periphery of the differential case 42 with a needle bearing 43 interposed therebetween.

A clutch 44, which couples the final driven gear 39 to the differential case 42, includes a hub 45 spline-coupled to the differential case 42, a sleeve 46 spline-coupled to an outer periphery of the hub 45, a fork 47 to laterally slide the sleeve 46, and a synchronizing mechanism 48 disposed between the hub 45 and the final driven gear 39.

Therefore, the final driven gear 39 is integrated with the differential case 42 to couple the clutch 44 by moving the sleeve 36 leftwards using the fork 47 to mesh it with the final driven gear 39 through the synchronizing mechanism 48.

The differential 38 includes a pinion shaft 49 fixed within the differential case 42, a pair of differential pinions 50, 50 rotatably supported on the pinion shaft 49, left and right axles 51L and 51R relatively rotatably supported within the differential case 42, and a pair of differential side gears 52, 52 spline-coupled to opposite ends of the left and right axles 51L and 51R and meshed with the differential pinions 50, 50.

A cooling system for the motor 15 and a lubricating system for the reduction unit 29 will be described below with reference to FIGS. 2 to 6.

A slinger chamber 61 is sandwiched between the casing body 11 of the casing 14 and the casing cover 12. A slinger shaft 62 is disposed in front of and below the main shaft 31, and supported at one end on the casing cover 12 with a needle bearing 63 and at the other end on a support wall 11a formed in the vicinity of a parting face of the casing body 11 with a needle bearing 64 interposed therebetween. A slinger 65 has six blades and is fitted over and fixed to an outer periphery of the slinger shaft 62 by a pin 66. A driven gear 67 is integrally formed with the slinger shaft 62 and disposed adjacent the slinger 65. The driven gear 67 is meshed with and driven by a driving gear 68 spline-coupled to an outer periphery of the main shaft 31.

Partition walls 11b and 12a are provided between an oil sump 69 and the slinger chamber 61, and below the differential 38 and the reduction unit 29. A dynamic oil surface Od2 in the slinger chamber 61 is defined by the partition walls 11b and 12a. A motor chamber 70 (see FIGS. 2 and 6) accommodating the rotor 23 and the stator 26 of the motor 15 communicates with the slinger chamber 61 through a through-bore 11c (see FIGS. 4 and 6) formed in the casing body 11.

Partition walls 11d and 12b (see FIGS. 4 and 5) project from inner surfaces of the casing body 11 and the casing cover 12, respectively, at a front portion of the casing 11. The partition walls 11d and 12b extend above the driving gear 68 provided on the main shaft 31 as well as the driven gear 67 provided on the slinger shaft 62. An oil catch tank 71 has an open upper surface defined by the partition walls 11d and 12b cooperating with each other. A rear side of the oil catch tank 71, in particular, a side opposed to an upper portion of the final driven gear 39 of the differential 38, is opened so that oil splashed from the oil sump 69 by the final driven gear 39 of the differential 38 is supplied to the oil catch tank 71.

An oil passage 12c (see FIGS. 2 and 5), with an upper end which opens into a bottom surface of the partition wall 12b of the casing cover 12, communicates at a lower end with an oil passage 31a axially extending through the inside of the main shaft 31. The oil passage 31a communicates with an oil passage 22a axially extending through the inside of the motor shaft 22. Therefore, the oil stored in the oil catch tank 71 is supplied to the oil passage 22a in the motor shaft 22 via the oil passage 12c in the casing cover 12 and the oil passage 31a in the main shaft 31 via gravitational force.

A tub-shaped oil-receiving portion 12d (see FIGS. 2 and 5) is formed in a lower end of the partition wall 12b of the casing cover 12 and faces an outer periphery of the slinger 65. A through-bore 12e (see FIG. 5) is formed in the partition wall 12b and located above the oil-receiving portion 12d. The oil in the oil catch tank 71 is supplied to the oil-receiving portion 12d through the through-bore 12e. The oil splashed by the slinger 65 rotating within the slinger chamber 61 is supplied to the oil-receiving portion 12d.

An oil passage 12f (see FIGS. 2, 5 and 6) formed in the casing 12 to extend from the oil-receiving portion 12d communicates with the oil passage 31a in the main shaft 31. Oil in the oil-receiving portion 12d is supplied to the oil passage 22a in the motor shaft 22 via the oil passage 31a in the main shaft 31. Of the oil supplied from the oil catch tank 71 via the through-bore 12e to the oil-receiving portion 12d, a surplus amount which has not been supplied to the oil passage 31a in the main shaft 31 is stored in the slinger chamber 61. Therefore, the amount of oil supplied to the slinger chamber 61 corresponds to a total of an amount of oil supplied from the motor chamber 70 through the through-bore 11c and an amount of oil supplied from the oil catch tank 71 through the through-bore 12e.

A portion of the oil returning from the motor chamber 70 is returned via the through-bore 11c to the slinger chamber 61. Another portion of the returning oil is returned via an oil passage 34a (see FIGS. 2 and 4) in the counter shaft 34 to the oil sump 69. Yet another portion of the returning oil is returned via a through-bore 11e (see FIG. 4) directly to the oil sump 69. The oil passed through the oil passage 34a in the counter shaft 34 is discharged into the casing 11 via through-bores 34b (see FIG. 2) extending radially through the counter shaft 34, thereby lubricating the reduction unit 29.

The operation of the embodiment of the present invention having the above-described structural arrangement is described below.

When the motor 15 is operated to drive the rear wheels, the rotation of the main shaft 31 connected directly to the motor shaft 22 is transmitted through the first reducing gear 35 and the second reducing gear 36 to the counter shaft 34. The rotation of the counter shaft 34 is transmitted through the final driving gear 37 to the final driven gear 39 of the differential 38. The torque of the motor 15 is distributed from the differential 38 to the left and right axles 51L and 51R.

When the motor 15 is stopped, the oil surface in the oil sump 69 provided on the bottom of the casing 14 defines a static oil surface Os. When the motor 15 is operational, the final driven gear 39 splashes oil in the oil in the oil sump 69. As such, the oil is supplied to and stored in the oil catch tank 71, wherein the oil surface in the oil catch tank 71 defines a dynamic oil surface Od1.

The oil in the oil catch tank 71 is supplied to the oil passage 22a in the motor shaft 22 via the oil passage 12c (see FIG. 5) in the casing cover 12 and the oil passage 31a (see FIG. 2) in the main shaft 31 via gravitational force. The oil in the oil catch tank 71 is supplied to the slinger chamber 61 via the through-bore 12e formed in the partition wall 12b of the casing cover 12. The oil in the motor chamber 70 is supplied to the slinger chamber 61 via the through-bore 11c (see FIGS. 4 and 6) formed in the casing body 11. Accordingly, the oil surface in the slinger chamber 61 defines a dynamic oil surface Od2.

The oil accumulated in the oil-receiving portion 12d in the slinger chamber 61, in particular, the oil supplied from the oil catch tank 71 and the oil splashed by the rotation of the slinger 65 within the slinger chamber 61, is supplied to the oil passage 22a in the motor shaft 22 via the oil passage 12f (see FIGS. 2, 5 and 6) in the casing cover 12 and the oil passage 31a (see FIG. 2) in the main shaft 31.

The oil supplied to the oil passage 22a in the motor shaft 22 is passed therefrom through the through-bores 22b extending radially through the motor shaft 22; diffused by a centrifugal force; passed through a space (not shown) defined between the laminated iron plates of the yoke 24 of the rotor 23; and ejected onto the inner surface of the stator 26, to effectively cool the rotor 23 and the stator 26.

The oil accumulated on the bottom of the motor chamber 70 is supplied to the reduction unit 29 via the oil passage 34a and the through-bores 34b (see FIG. 2) in the counter shaft 34, wherein various portions of the reduction unit 29 are lubricated. A portion of the oil returning from the motor chamber 70 is returned to the slinger chamber 61 via the through-bore 11c. Another portion of the returning oil is returned to the oil sump 61 via the through-bore 11e.

In this manner, in an operational state of the motor 15, the oil is stored in the oil catch tank 71 and the slinger chamber 61, wherein the dynamic oil surface Od3 in the oil sump 69 in the casing 14 is lower than the static oil surface Os.

As described above, the motor 15 is cooled using the oil stored in the casing 14 to lubricate the differential 38 and the reduction unit 29, so that the structure is simplified, as compared with a case where the motor 15 is cooled by cooling water passing through a radiator. Specifically, the oil is diffused from inside the motor shaft 22 by the centrifugal force. Hence, the cooling effect is remarkably enhanced as compared with the case where the oil splashed from the oil sump 69 is sprinkled only onto the motor 15.

The oil for cooling the motor 15 is supplied from the oil catch tank 71 by the gravitational force or from the slinger 65 in the slinger chamber 61. Moreover, the slinger 65 is driven by the motor 15 without the need to provide a special drive source. Therefore, it is possible to provide reductions in the number of parts, weight, friction resistance, and cost.

Moreover, when the vehicle is traveling with the clutch 44 of the motor 15 coupled, the slinger 65 is rotated by the driving force of the motor 15, thereby cooling the motor 15. When the vehicle is regeneratively braked with the clutch 44 of the motor 15 coupled, the slinger 65 is rotated by the driving force of the rear wheels, thereby cooling the motor 15.

During driving of the motor 15, the oil surface in the oil sump 69 is lowered from the static oil surface Os to the dynamic oil surface Od3, so that the oil-agitation resistance provided by the final driven gear 39 is decreased to contribute to energy saving.

In addition, the motor 15 is liable to be heated due to a heat loss increased during low rotation/a high torque and during high rotation/a low torque. However, even if the amount of oil splashed by the final driven gear 39 during low rotation is decreased to lower the dynamic oil surface in the oil catch tank 71, and the amount of oil supplied from the oil passage 12c to the motor 15 by the gravitational force is decreased, the oil is supplied from the motor chamber 70 through the through-bore 11c to the slinger chamber 61. Therefore, a sufficient amount of the oil is supplied to the motor 15 by the slinger 65.

Even when the vehicle is traveling, if the motor 15 is stopped with the clutch 44 cut off, the slinger 65 and the final driven gear 39 are also stopped. Therefore, the oil-agitation resistance provided by the slinger 65 and the final driven gear 39 cannot be unnecessarily increased. Moreover, even if the vehicle is stopped, if the motor 15 is driven with the clutch 44 cut off, the slinger 65 is rotated to cool the motor 15.

Further, the slinger chamber 61 and the oil sump 69 are partitioned from each other by the partition walls 11b and 12a, so that when a road surface is inclined or when a longitudinal acceleration of the vehicle is generated, the oil is retained in the slinger chamber 61 to reliably cool the motor 15.

Although the embodiment of the present invention has been described in detail, it will be understood that the present invention is not limited to the above-described embodiment, and various modifications in design may be made without departing from the spirit and scope of the invention defined in the claims.

What is claimed is:

1. A motor-cooling structure of a front-and-rear-wheel-drive vehicle having an engine adapted to drive first driven wheels and a motor adapted to drive second driven wheels, wherein a driving force of the motor is transmitted to the second driven wheels through a reduction unit and a differential, the motor-cooling structure comprising:
   a casing accommodating the reduction unit and the differential therein;
   an oil sump formed on a bottom of the casing;
   a first oil storage chamber provided within the casing, the first oil storage chamber storing an oil splashed from the oil sump by a driven gear of the differential;
   a second oil storage chamber provided within the casing, the second oil storage chamber storing the oil splashed from the oil sump by the driven gear of the differential;
   a first oil supply passage provided in an inner surface of the casing to supply the oil stored within the first storage chamber into a motor shaft by gravitational force, wherein the motor accommodated in a motor housing coupled to the casing is cooled;
   an oil supply means disposed in the second oil storage chamber and driven by the motor; and
   a second oil supply passage provided in the inner surface of the casing to supply the oil splashed by the oil supply means into the motor shaft to cool the motor.

2. The motor-cooling structure according to claim 1, further comprising:
   a third oil supply passage to supply the oil in the first oil storage chamber to the second oil storage chamber by the gravitational force.

3. The motor-cooling structure according to claim 2, further comprising:
   a tub-shaped oil-receiving portion provided at a location below the third oil supply passage and facing an outer periphery of the oil supply means, wherein the tub-shaped oil-receiving portion guides the oil supplied from the third oil supply passage and the oil supply means to the second oil supply passage.

4. The motor-cooling structure according to claim 2, wherein the second oil storage chamber and the oil sump are partitioned from each other by a partition wall.

5. The motor-cooling structure according to claim 1, further comprising:
   a clutch disposed between the driven gear and the differential.

6. The motor-cooling structure according to claim 5, wherein, when the clutch is coupled, the oil supply means is driven by the motor or the second driven wheels.

7. The motor-cooling structure according to claim 5, wherein, when the clutch is cut off, the oil supply means is driven by the motor.

* * * * *